US011228741B2

United States Patent
Ishii et al.

(10) Patent No.: US 11,228,741 B2
(45) Date of Patent: Jan. 18, 2022

(54) SEAMLESS TILED DISPLAYS

(71) Applicants: Fusao Ishii, Pittsburgh, PA (US); Victor Stone, Pittsburgh, PA (US)

(72) Inventors: Fusao Ishii, Pittsburgh, PA (US); Victor Stone, Pittsburgh, PA (US)

(73) Assignees: Fusao Ishii, Pittsburgh, PA (US); Victor Stone, Pittsburgh, PA (US)

( * ) Notice: Subject to any disclaimer, the term of this patent is extended or adjusted under 35 U.S.C. 154(b) by 249 days.

(21) Appl. No.: 16/231,461

(22) Filed: Dec. 22, 2018

(65) Prior Publication Data

US 2019/0387206 A1 Dec. 19, 2019

Related U.S. Application Data

(63) Continuation-in-part of application No. PCT/US2014/000135, filed on May 28, 2014.

(60) Provisional application No. 62/610,247, filed on Dec. 25, 2017, provisional application No. 61/855,948, filed on May 28, 2013.

(51) Int. Cl.
| | |
|---|---|
| *H04N 9/31* | (2006.01) |
| *G03B 21/625* | (2014.01) |
| *G03B 21/60* | (2014.01) |
| *G03B 37/04* | (2021.01) |
| *G03B 21/602* | (2014.01) |

(52) U.S. Cl.
CPC ............ *H04N 9/3147* (2013.01); *G03B 21/60* (2013.01); *G03B 21/625* (2013.01); *G03B 37/04* (2013.01); *H04N 9/3164* (2013.01); *H04N 9/3185* (2013.01); *G03B 21/602* (2013.01)

(58) Field of Classification Search
CPC .............. H04N 9/3147; H04N 9/3185; H04N 9/3182; G03B 21/625; G03B 21/28; G03B 21/14
See application file for complete search history.

(56) References Cited

U.S. PATENT DOCUMENTS

| | | | | | |
|---|---|---|---|---|---|
| 5,796,499 | A | * | 8/1998 | Wenyon | G03B 21/62 348/757 |
| 2007/0103583 | A1 | * | 5/2007 | Burnett | H04N 9/3147 348/383 |
| 2008/0218853 | A1 | * | 9/2008 | El-Ghoroury | G03B 21/625 359/449 |
| 2016/0366379 | A1 | * | 12/2016 | Hickl | H04N 9/3147 |

* cited by examiner

*Primary Examiner* — Ryan D Howard
(74) *Attorney, Agent, or Firm* — Bo-In Lin

(57) ABSTRACT

A seamless large screen image display having multiple tiled projection screens is disclosed. The screens can have a decorative pattern as well as black surface. Images can be presented without noticing the decorative patterns.

16 Claims, 19 Drawing Sheets

SEAMLESS TILED DISPLAYS

CROSS-REFERENCES TO RELATED APPLICATIONS

This application is a Non-provisional Application and claims the Priority date of a previously file Provisional Application 62/610,247 filed on Dec. 5, 2017. The Application 62/610,247 is a Continuation in Part (CIP) Patent Application of (PCT/US14/00135 filed on May 28, 2014) and its Provisional Application 61/855,948 on May 28, 2013, which is also a Continuation in Part patent application Ser. No. 11/285,881 filed on Nov. 23, 2005 and issued into U.S. Pat. No. 7,595,828. Other related applications are U.S. Patent Provisional Applications 62/071,310 on September 2014 and 62/177,750 on Mar. 23, 2015. This application is also a Continuation-in-Part (CIP) of patent application Ser. No. 14/756,589) filed on Sep. 21, 2015 and its provisional application (62/071,310) filed on Sep. 20, 2014.

TECHNICAL FIELD

This invention relates to a display system for projecting an image on large tiled screens seamlessly. More particularly, this invention enables to create a continuous image on tiled screens with overlapped images so that the seams between screens are not visible.

BACKGROUND

In recent years, large screen displays became very popular for public signage. Tiled LCD displays are often used for large public signages such as video walls. However it is difficult to connect images without seams. Obviously no-seam display looks better for viewers. After tricolor LEDs were developed, an array of LED lights are used for large size signage by creating a large video wall display. However assembling so many LEDs to create a high definition display is costly and as well as high power consumption but also is difficult to have high resolution because of the size of LED chips. Seams between screens are annoying for viewers and this invention will eliminate seams between screens.

FIG. 1 shows an example of a prior art where tiled screens (1001) have seams (1002) between individual screens. FIG. 2 shows an example of a prior art wherein projection screens (2001) are connected with brackets (2002) and holders (2003) which are visible to viewers. A projector (2005) projects light (2004) toward the screen (2001) where some of light is obstructed by holdouts (2003) and brackets (2002).

FIG. 8 shows an example of a rear projection system according to a prior art disclosure. The projected light beam (8002) is collimated to a parallel beam so that it enters a lenticular (8005) which is a single dimensional cylindrical lens and bend beams only in one direction. The lenticular is typically made by extrusion method which can create cylindrical lens, but cannot create two-dimensional spherical lens. Viewers can have only large horizontal viewing angle, but the vertical viewing angle is limited to a very small angle. Only the protruded surface (8006) is blacken and the dipped area (8009) where light comes through is left transparent, which occupies a large area and the surface reflectance of light is still high, which cannot provide high contrast images in bright ambient environment.

SUMMARY

It is an aspect of this invention to disclose a new and improved tiled display system that comprises image projectors and rear projection screens wherein the edges of two projection screen are optically connected and wherein projected light beams from two adjacent units are overlapped at interconnection areas and the overlapped images are aligned and the intensities are adjusted to minimize discontinuities of images and visible seams in the interconnection areas.

It is another aspect of this invention to disclose new and improved tiled display system that comprises image projectors and rear projection screens wherein the projection screens comprise at least one of a Fresnel lens, a diffusing layer, a lenticular, micro-lens-array and a layer with holes.

It is another aspect of this invention to disclose new and improved tiled display system that comprises image projectors and rear projection screens wherein a sum of the intensities of two light beams projected from the projectors in the connecting area of two screens from two adjacent projectors is substantially equal to that of the middle area.

It is another aspect of this invention to disclose new and improved tiled display system that comprises image projectors and rear projection screens wherein two adjacent screens are connected optically with glue having substantially same refractive index as those of connecting screens.

It is another aspect of this invention to disclose new and improved tiled display system that comprises image projectors and rear projection screens wherein an alignment and the intensities of the brightness of two images from two adjacent projectors are measured by a camera and adjusted automatically so that the seams are substantially not visible.

It is another aspect of this invention to disclose new and improved tiled display system that comprises image projectors and rear projection screens wherein a layer of screen exposed to viewers is a continuous single piece of sheet so that no seam on the screen is visible.

It is another aspect of this invention to disclose new and improved tiled display system that comprises image projectors and rear projection screens and further comprises a micro-lens-array made of UV curable resin and its shape is formed with lithography using the holes in the screen. Furthermore, in another embodiment, the micro-lens-array is molded with a cylindrical mold in a roll-to-roll system with UV curable resin.

It is another aspect of this invention to disclose new and improved tiled display system that comprises image projectors and rear projection screens and wherein the screens with holes are made by at least one of lithography and etching and in another embodiment an exposure system for performing the lithography has a cylindrical reticle which exposes hole patterns continuously without seam. In another embodiment, the exposure system for performing the lithography has a cylindrical reticle that exposes hole patterns continuously without seam. In another embodiment, the reticle is made on the surface of cylindrical roller and made of at least one of etched metal, exposed emulsion and exposed photo-resist.

It is another aspect of this invention to disclose new and improved tiled display system that comprises image projectors and rear projection screens and wherein the screens are formed with a hologram layer.

Various advantages of the disclosed technology will be apparent in light of the descriptions below.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced or designed without these specific details. In other instances, well-known methods, procedures, components, and circuits have not been described in detail so as not to unnecessarily obscure aspects of the embodiments.

The technical solution of the present disclosure will be clearly and completely described in the following with reference to the accompanying drawings. It is obvious that the embodiments to be described are examples and only a part rather than all of the embodiments of the present disclosure. All other embodiments obtained by persons skilled in the art based on the described embodiments of the present disclosure shall fall within the protection scope of the present disclosure.

Figure 1:
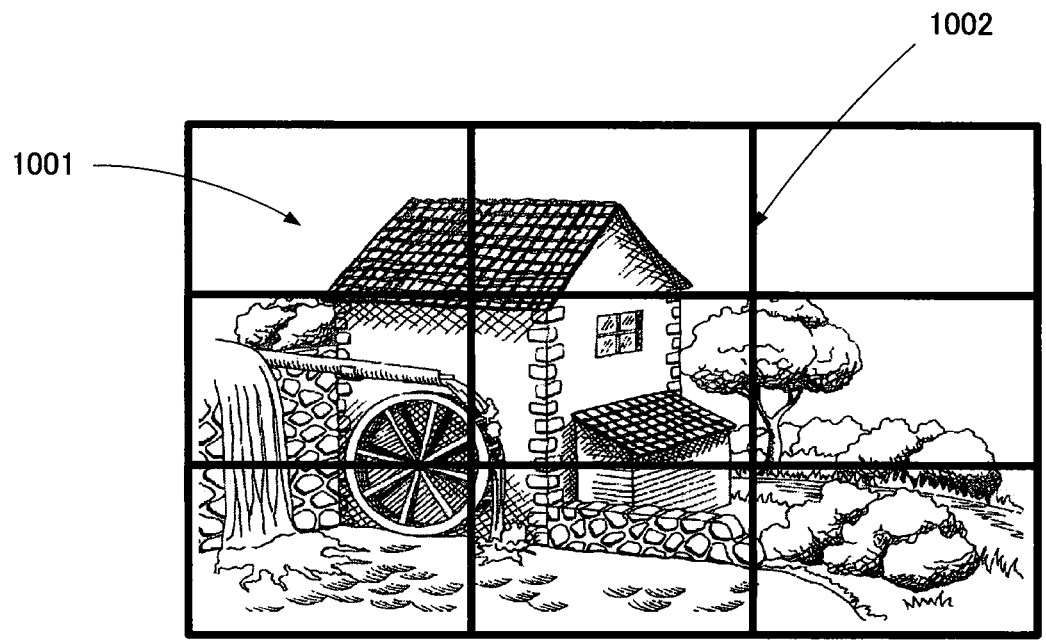
FIG. 1 shows a conventional projecting system with tiled screens that have seams between individual screens.
Figure 2:
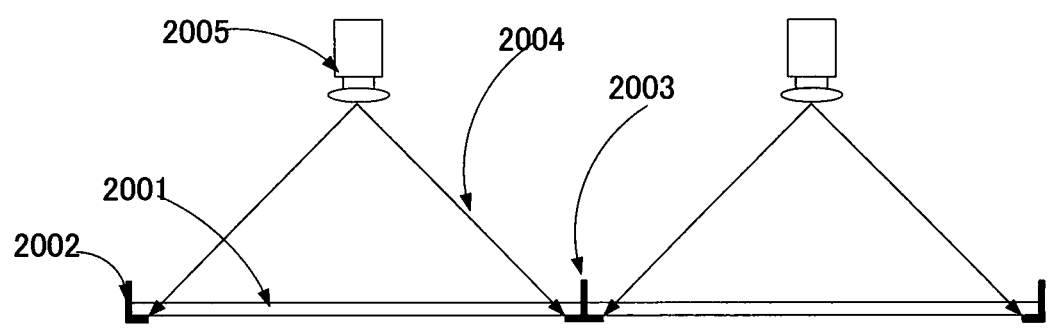
FIG. 2 shows another conventional projection screens connected with brackets and holders which are visible to viewers.
Figure 3:
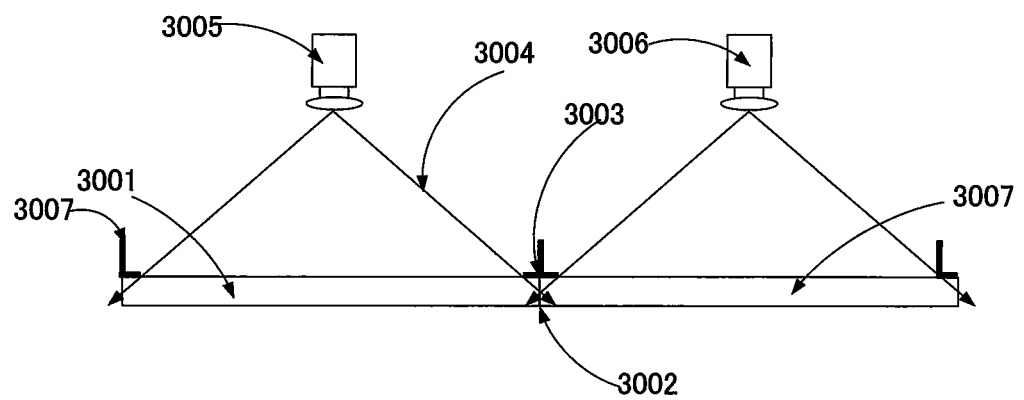
FIG. 3 shows an exemplary embodiment of a projector of this invention.

FIG. 3 shows an exemplary embodiment of this invention. An image is projected by the projector (3005) to the screen (3001) and another image is projected by the projector (3006) to another screen (3007). The two images are overlapped at the connecting portion (3002). To hold the screen (3001), the brackets (3008) and holders (3003) can be used on the upper surfaces not to obstruct the projection light beams (3004).

Figure 4:
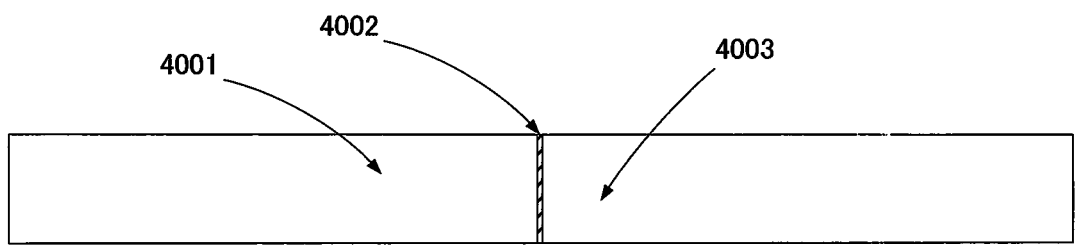
FIG. 4 shows another exemplary embodiment of a projector of this invention.

FIG. 4 shows another exemplary embodiment of this invention, wherein the two screens (4001 and 4003) are connected with glue (4002) whose refractive index is same as those of screens (4001 and 4003), so that the connection portion is not visible.

Figure 5:
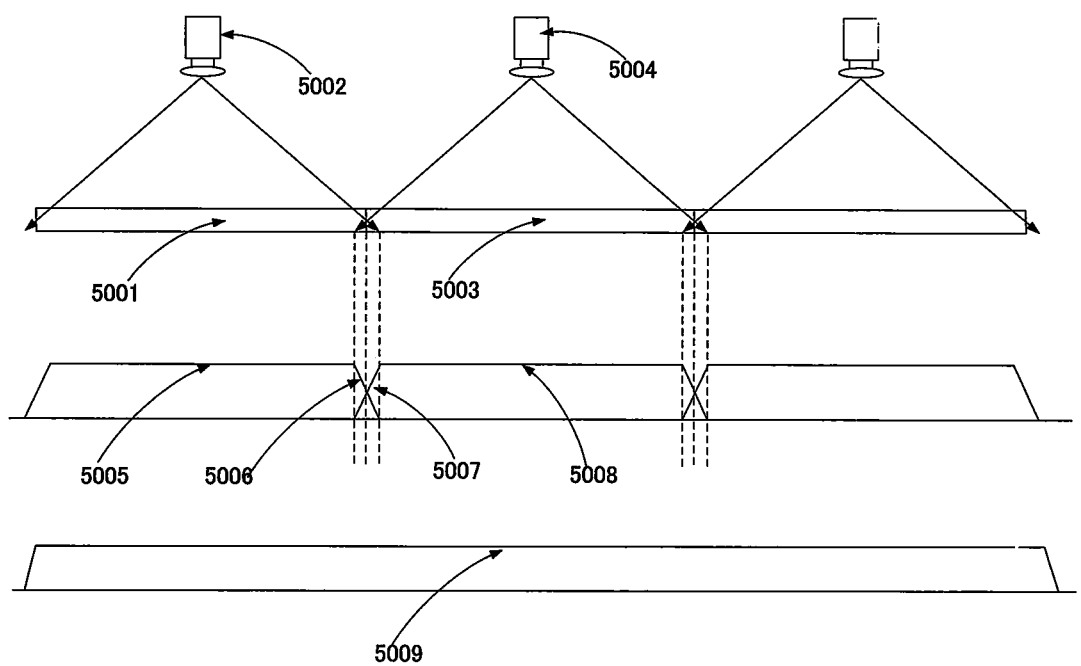
FIG. 5 shows another exemplary embodiment of a projector of this invention.

FIG. 5 shows another exemplary embodiment of this invention, where the projector (5002) projects an image to the screen (5001) and the projector (5004) projects an image to the screen (5003), the intensity of brightness is shown at (5005). The intensity of brightness from the projector (5002) at the non-overlapping area (5006) is 100% of the peak brightness of the projector and the intensity at the overlapping area (5006) decreases from 100% to 0% although the intensity from the projector (5004) increases from 0% to 100% so that the sum of the two projectors (5002 and 5004) is always 100%. This method has a minimum impact even if the image locations are misaligned as FIG. 6 and FIG. 7. If needed, additional projector(s) and screen(s) may be added as the projector and screen that are not designated with alphanumeric labels as that shown in FIG. 5.

Figure 6:
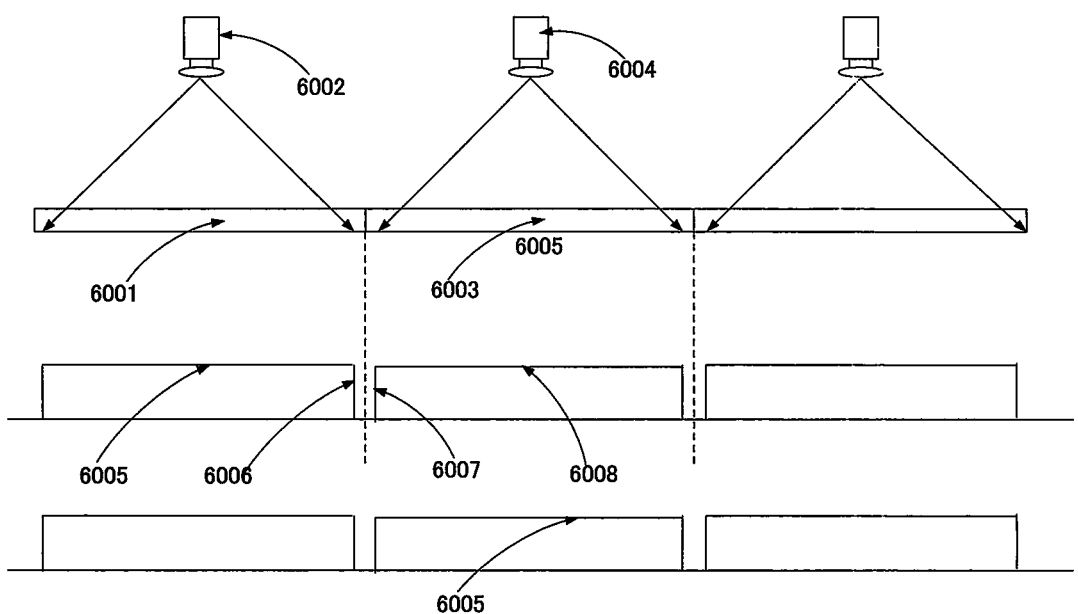
FIG. 6 describes and exemplifies the errors when the image location is misaligned and the image size is smaller than the size of screen of a projector.

FIG. 6 shows the errors when the image location is misaligned and the image size is smaller than the size of screen. The total intensity combining the intensities from the two projectors is shown at the graph (5009). The total intensity distribution will be 100% except the edge area, but the intensity of brightness will be 0% at the edge area, which will make the edge visible as a seam. If needed, additional projector(s) and screen(s) may be added as the projector and screen that are not designated with alphanumeric labels as that shown in FIG. 6.

Figure 7:
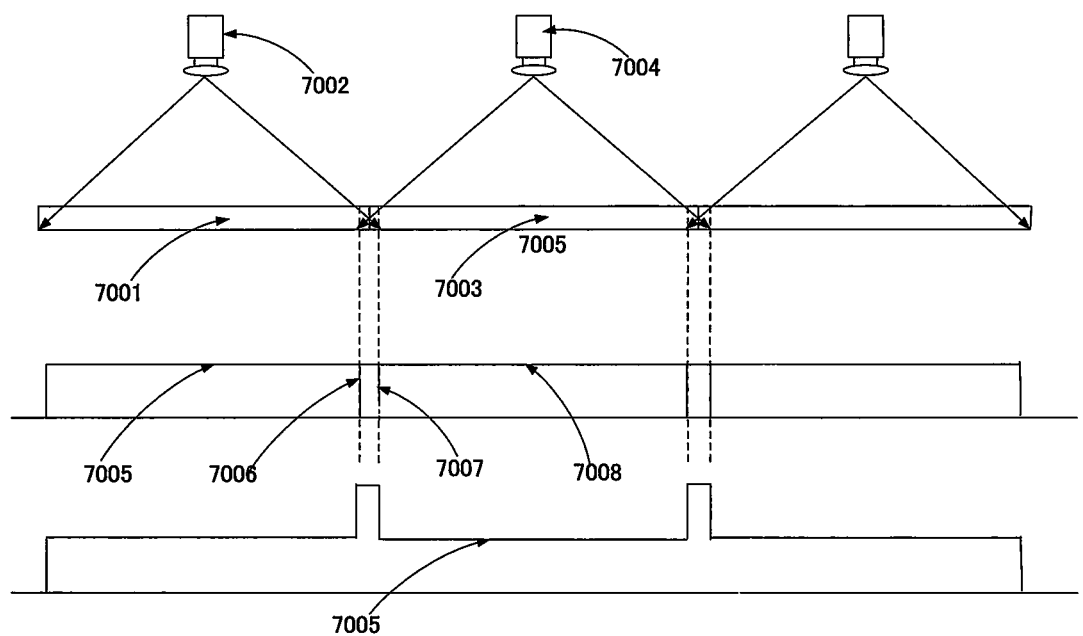
FIG. 7 describes and exemplifies the errors when the image location is misaligned and the image size is larger than the size of screen of a projector.
Figure 8:
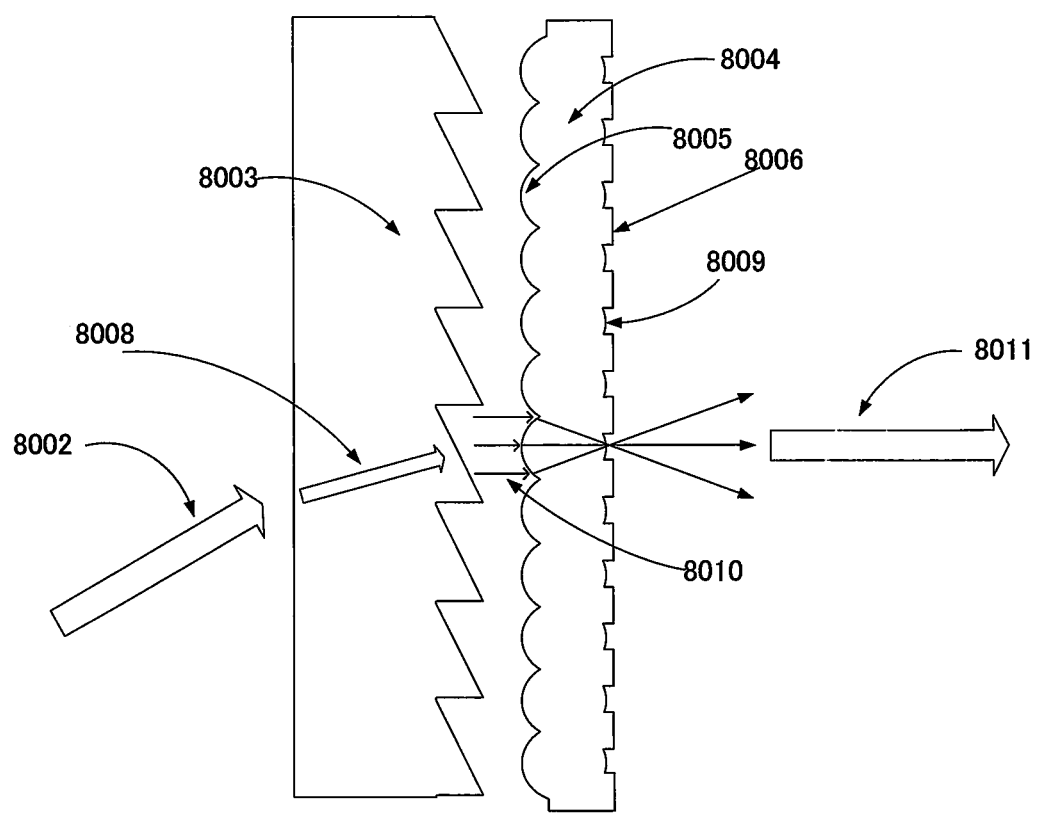
FIG. 8 shows a conventional rear projection system which cannot provide high contrast images in bright ambient environment.

FIG. 7 exemplifies the errors when the image location is misaligned and the image size is larger than the size of screen. The total intensity combining the intensities from the two projectors is shown at the graph (5009). The total intensity distribution will be 100% except the edge area, but 200% at the edge area, which will become a visible band. If needed, additional projector(s) and screen(s) may be added as the projector and screen that are not designated with alphanumeric labels as that shown in FIG. 7.

Figure 9:
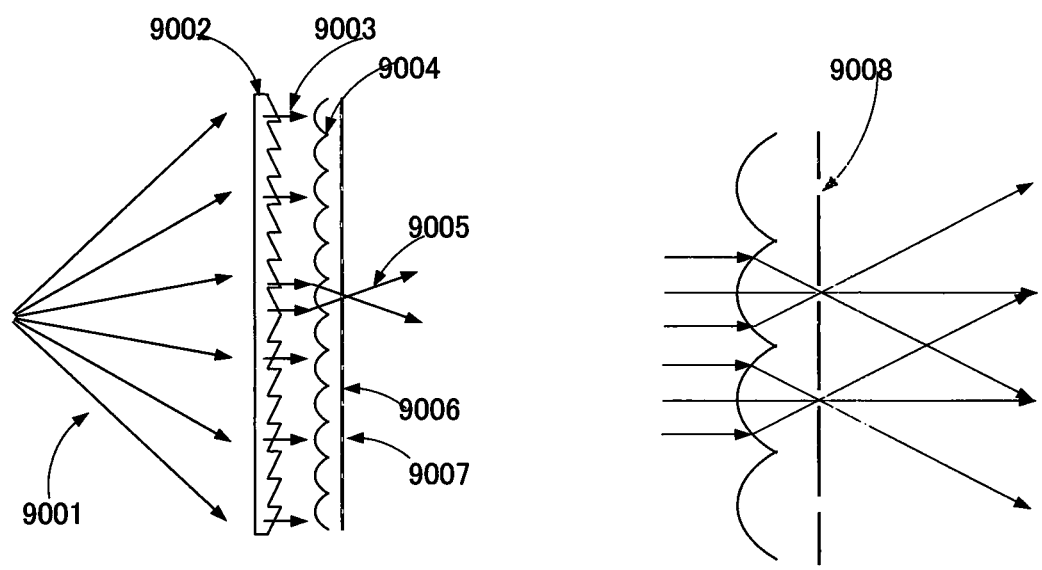
FIG. 9 shows an exemplary embodiment of a display system implemented as the unit display system for the tiled displays of this invention.

FIG. 9 shows a display system implemented for tiled displays of this invention. The light beams (9001) are projected to the Fresnel lens (9002) and the Fresnel lens collimates the light beams (9001) to parallel beams (9003), so that the beams (9003) enter the micro-lens-array (9004) in the normal direction. The micro-lens-array focuses the beams into small holes (9008), so that the light beams diverge toward viewers in two dimensional directions, which provides large viewing angles in both horizontally and vertically. The surface area (9006) except holes (9007 and 9008) are blacken or patterned reduce the surface reflectance of light thus providing very high contrast images even in bright ambient environment.

Figure 10:
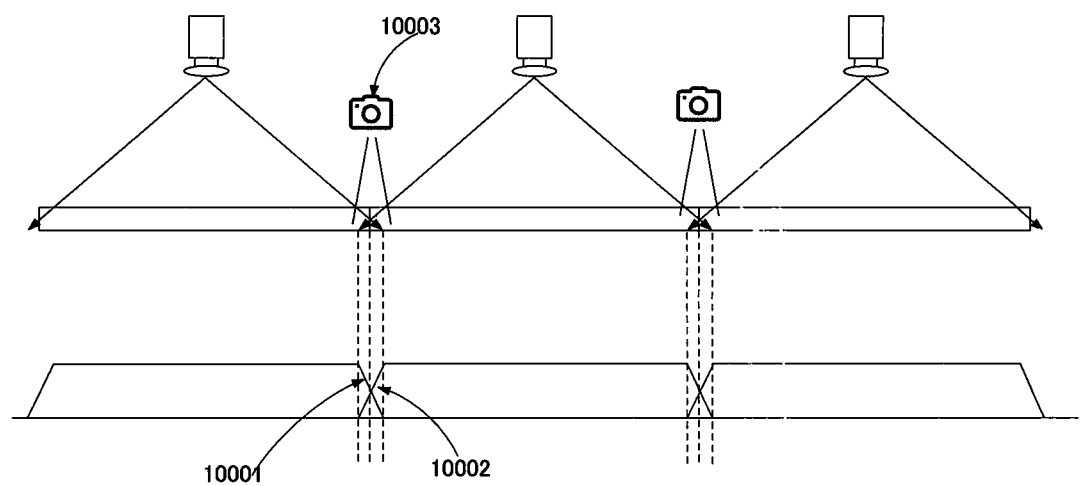
FIG. 10 shows another exemplary embodiment of this invention.

FIG. 10 shows another exemplary embodiment of this invention. The camera (10003) is disposed inside the projection system capture images at the overlapping area (10001 and 10002) and adjusts the alignment of images from both sides automatically. The adjustment is performed electronically by shifting the images of projectors and adjusting the intensity and therefore, the seam in the overlapping area is not visible.

Figure 11:
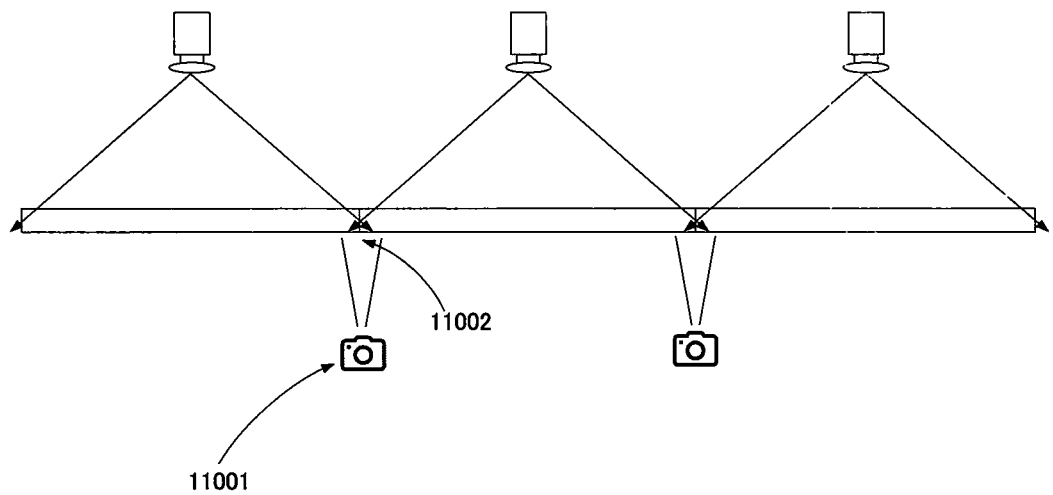
FIG. 11 shows another exemplary embodiment of this invention.

FIG. 11 shows another exemplary embodiment of this invention wherein the cameras (11001) is disposed outside the projection system that captures the images at the overlapping area (11002).

Figure 12:
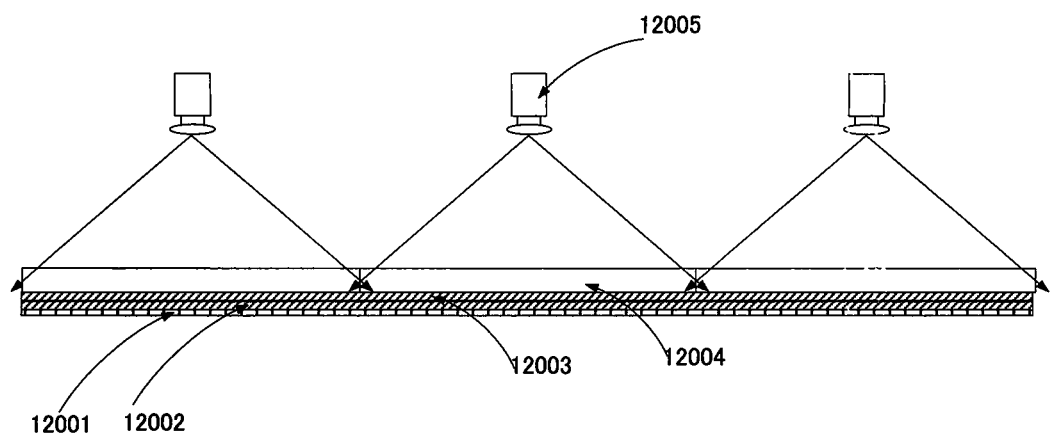
FIG. 12 shows another exemplary embodiment of this invention.

FIG. 12 shows another exemplary embodiment of this invention. In front of a display system (12004), a Fresnel lens (12003) is placed and a diffusion layer (12002) is placed and a layer with holes (12001) is placed as shown in FIG. 9.

Figure 13:
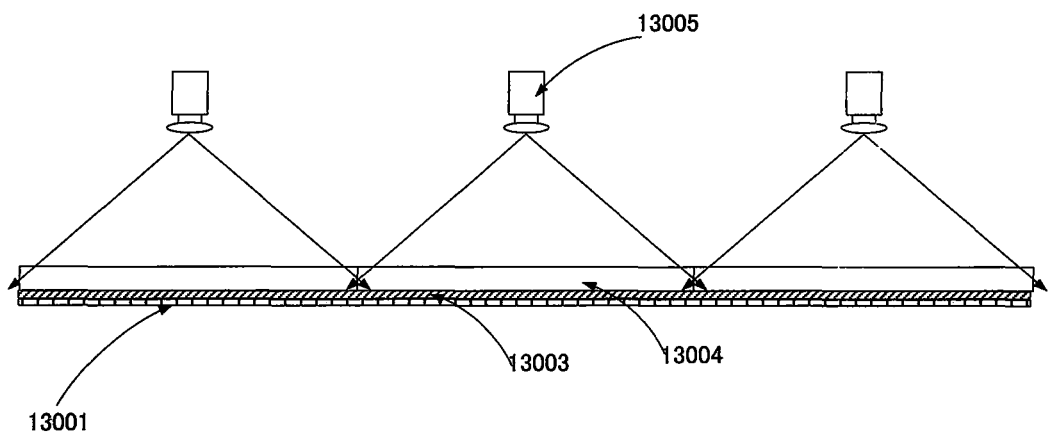
FIG. 13 shows another exemplary embodiment of this invention.

FIG. 13 shows another example of this invention, where only a diffusion layer (13001) and a layer with holes (13003) are used in front of seamless tiled displays.

Figure 14:
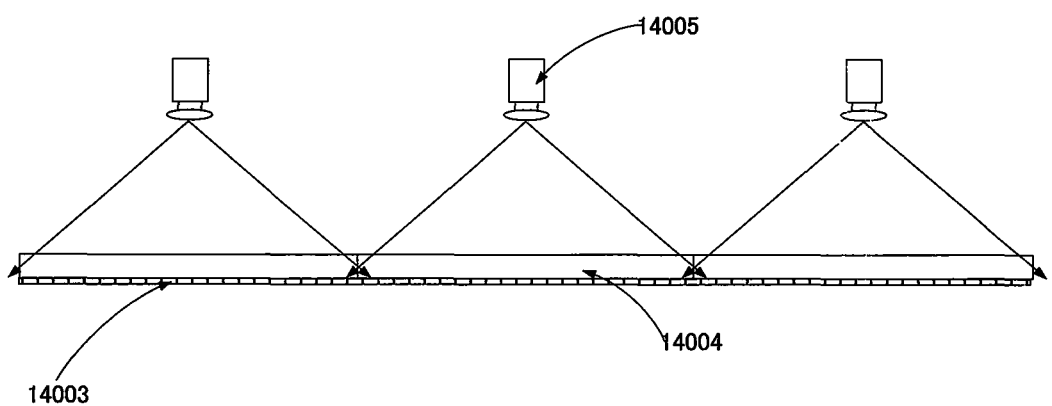
FIG. 14 shows another exemplary embodiment of this invention where only a diffusion layer is used in front of seamless tiled displays.

FIG. 14 shows another example of this invention, where only a diffusion layer (14003) is used in front of seamless tiled displays (14004).

Figure 15:
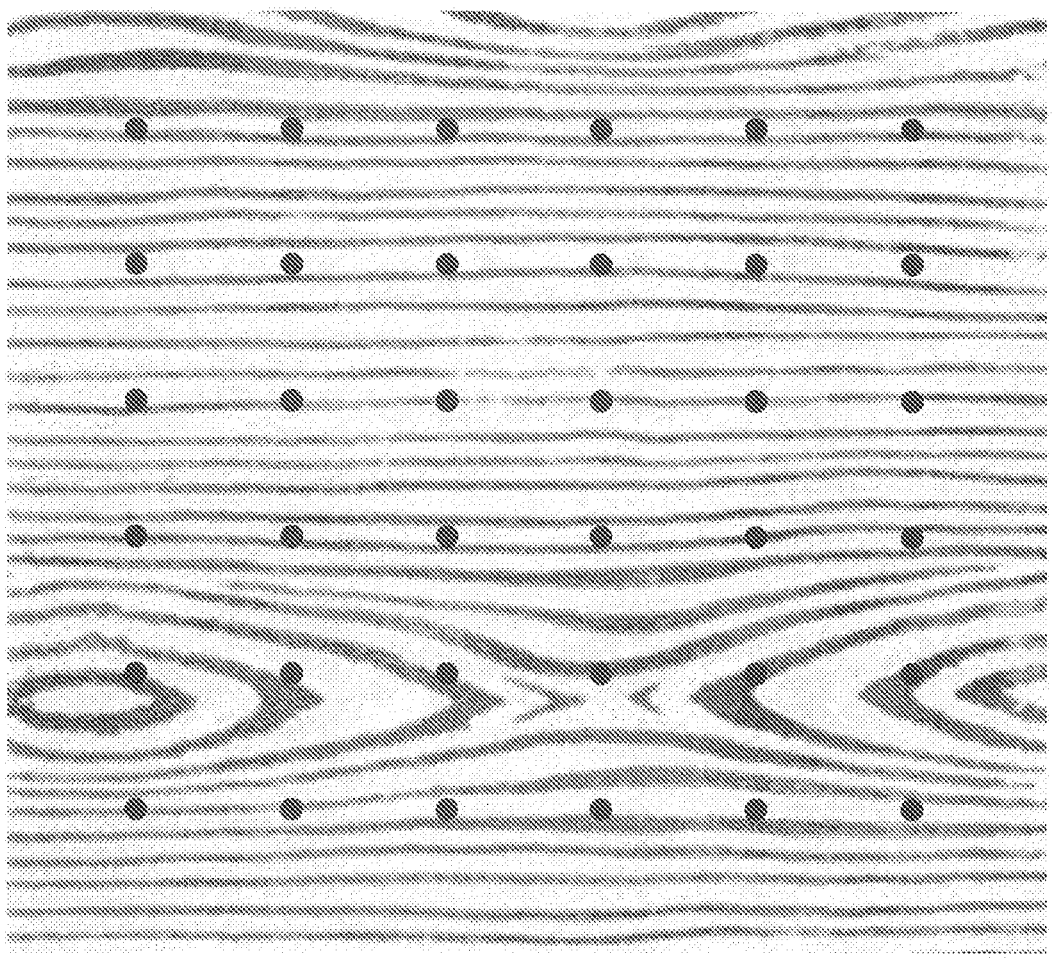
FIG. 15 shows another exemplary embodiment of this invention where a decorative screen with holes is combined with seamlessly tiled projection displays of this invention.

FIG. 15 shows an example of a decorative screen with holes disclosed in the previous applications (Ser. No. 14/756,589 and 62/071,310) combined with seamlessly tiled projection displays disclosed in this invention.

Figure 16:
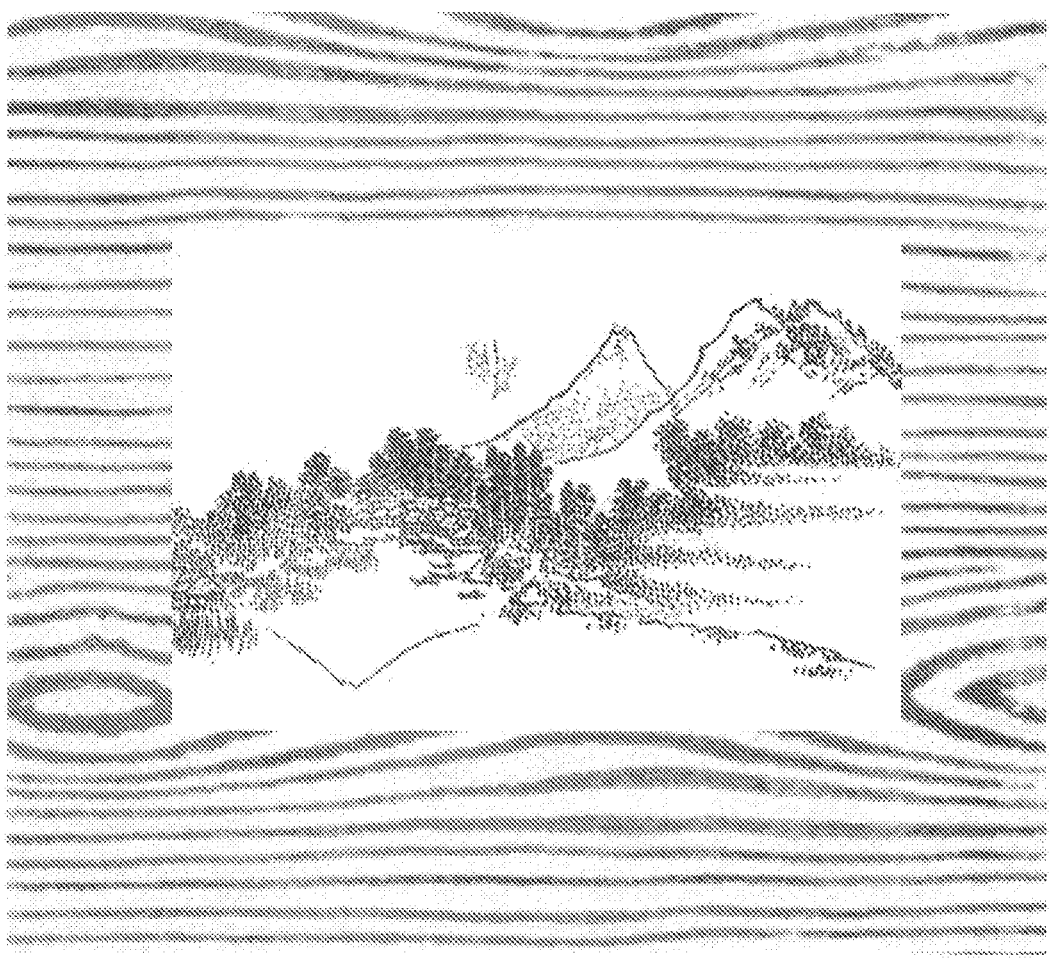
FIG. 16 shows another exemplary embodiment of this invention where a decorative screen with holes showing a projected image combined with a decorative pattern (Woody pattern) becomes non-visible in the image area.

FIG. 16 shows an example of a decorative screen with holes showing a projected image, where decorative pattern (Woody pattern) becomes non-visible in the image area.

Figure 17:
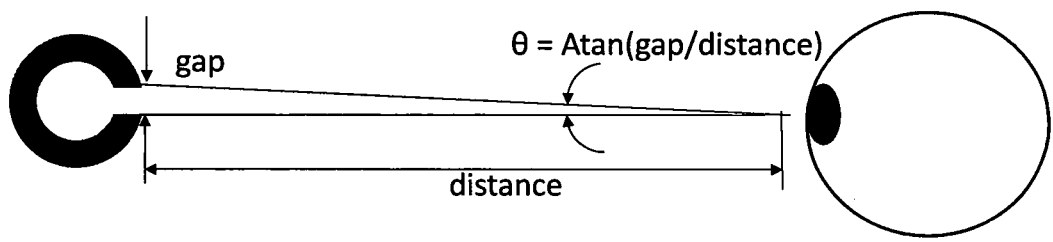
FIG. 17 shows the resolution power of human eyes.

FIG. 17 shows the resolution power of human eyes. The subtending angle θ (theta) is defined as θ (theta)=Atan (gap/distance) and human eye can recognize down to 0.5 to 1 minute (=1/60 degrees). The holes will not be recognizable if the diameter is lower than the subtending angle of 0.5 minutes.

Figure 18:
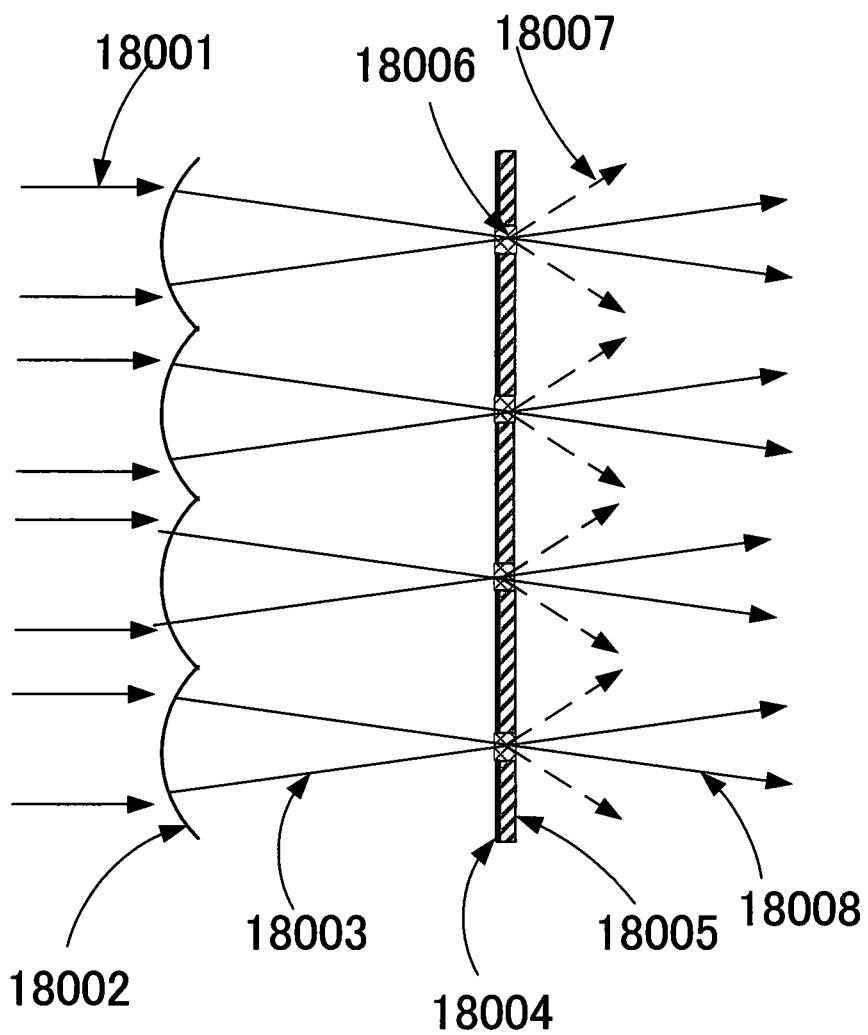
FIG. 18 shows another exemplary embodiment of this invention where a screen is combined with tiled displays of this invention.

FIG. 18 shows an example of screen combined with tiled displays by this invention. The projected light beams (18001) are focused to the holes with diffuser material (18006) and emitted toward viewers with a divergent angle (18007). The larger divergent angle, the larger is the viewing angle for viewers. The base substrate of screen can be plastic or metal. The surface (18004 or 18005) of the substrate can be coated with decorative pattern (18005) or blacken (18004) to avoid unnecessary reflection.

Figure 19:
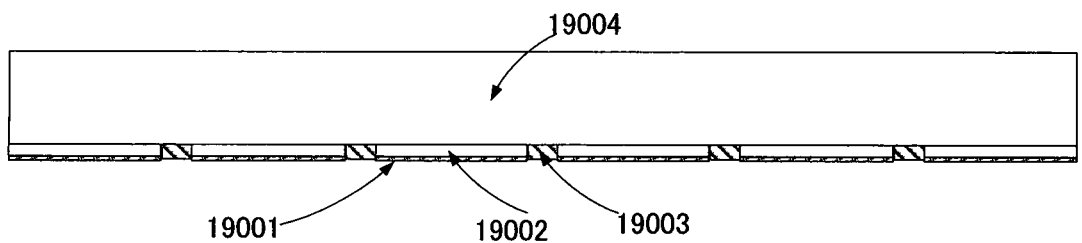
FIG. 19 shows the manufacturing method of this invention.

FIG. 19 shows an example of manufacturing method by this invention. A base substrate (19002) with holes is coated with diffusion material (19003) and the decorative coating on the outside of the screen (19001) is applied. On the backside of the substrate, transparent UV photo-sensitized layer (19004) is coated. The transparent UV photo-sensitized material may include photoresist or UV resin.

Figure 20:
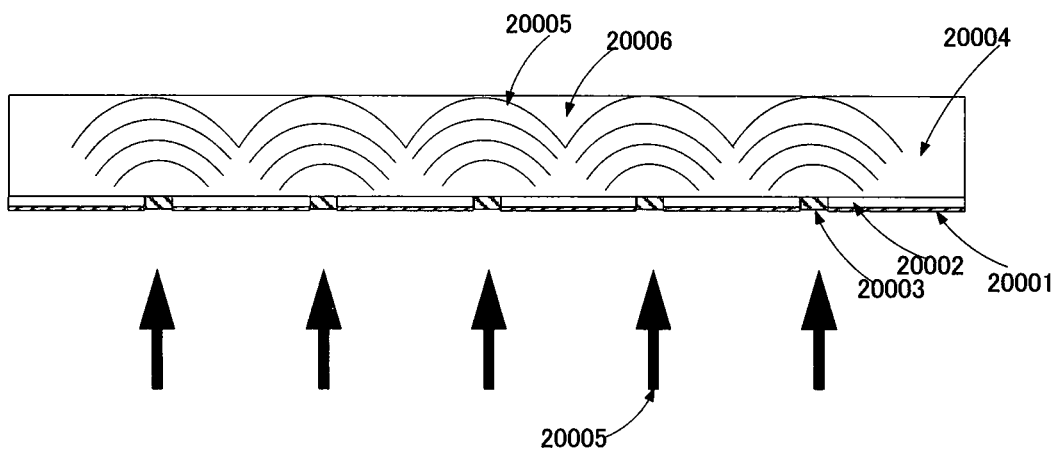
FIG. 20 shows a manufacturing method of a micro-lens-array implemented in this invention.

FIG. 20 shows a manufacturing method of micro-lens-array. UV exposure light (20005) is applied to the substrate and the exposure light is scattered by the diffusion material (20003) and exposes the UV sensitized layer (20004). The intensity distribution can be controlled so that the equi-intensity distribution (20005) is same as the surface shape of micro-lens-array. Unexposed or less exposed area (20006) will be eliminated by chemical etching at the development process so that micro-lens array will be formed.

Figure 21:
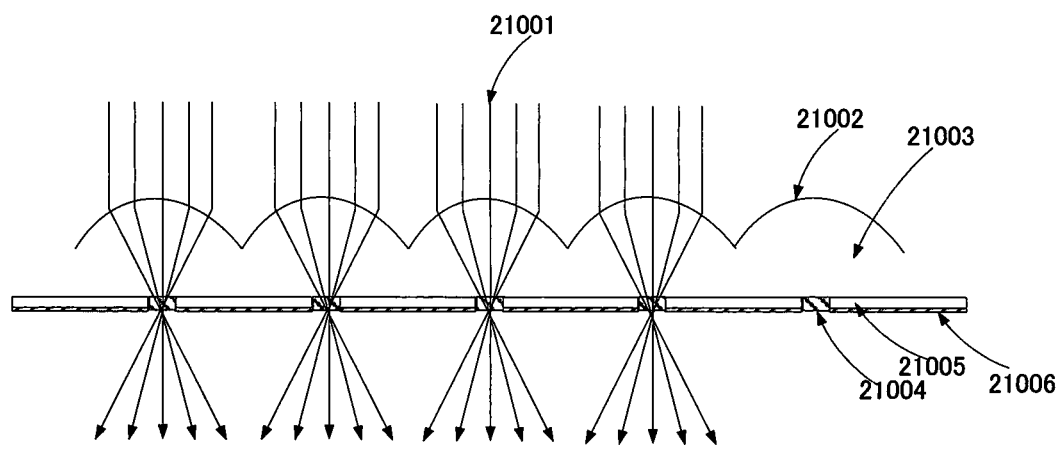
FIG. 21 shows the light path with the screen implemented with the micro-lens-array formed in FIG. 20.

FIG. 21 shows that light path using the screen with micro-lens-array formed as explained in the previous paragraph. The incident light beams (21001) are focused into the holes (21004) where diffusion material is filed in. The incoming light will be scattered toward viewers. Because the incident light beams are focused into the holes, the large percentage of light passes though the holes so that the light intensity is not reduced substantially in spite of small holes. From viewer side, the majority of light from the outside of the display system will be absorbed by the coating (21006) and the reflected light is minimum so that the contrast ratio of the image will be high. High reflectance screens without holes and dark coating will cause so called "wash-out" of images and the black image does not become black but gray.

Figure 22:
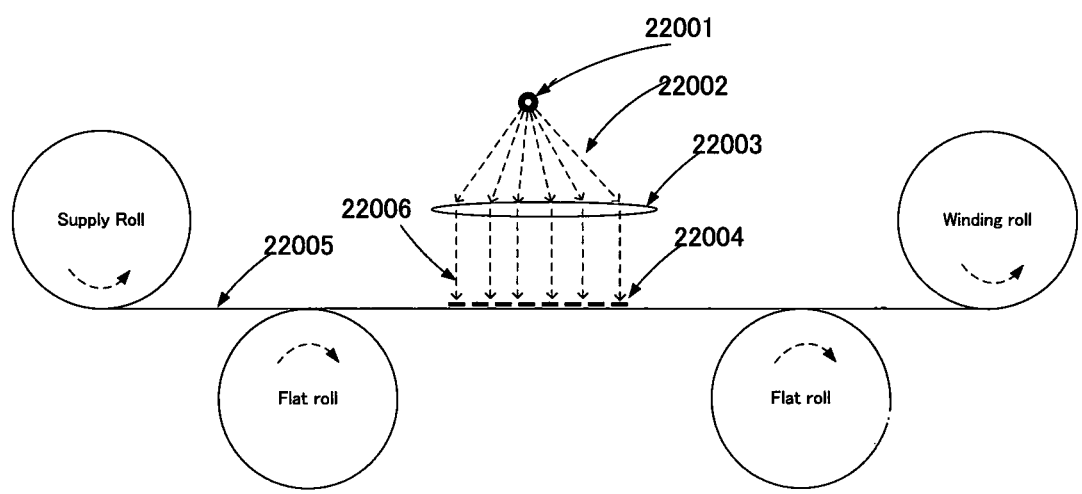
FIG. 22 shows an exemplary manufacturing method of this invention.

FIG. 22 shows an example on manufacturing method by this invention. A base substrate with holes can be manufactured by roll to roll method as shown in FIG. 22. A base substrate can be plastic or metal. The substrate (22005) can be released from the supply role and transferred to the exposure table (22001 through 22006). A UV light source (22001) emits UV light (22002) which is collimated (22006) by the collimation lens (22003) and hits the reticle (22004) in the normal direction. The photo-resist coated on the substrate will be exposed. The exposed substrate can be wound or transferred to chemical etching for development directly on the web. Holes can be made by etching and the photoresist can be stripped chemically.

Figure 23:
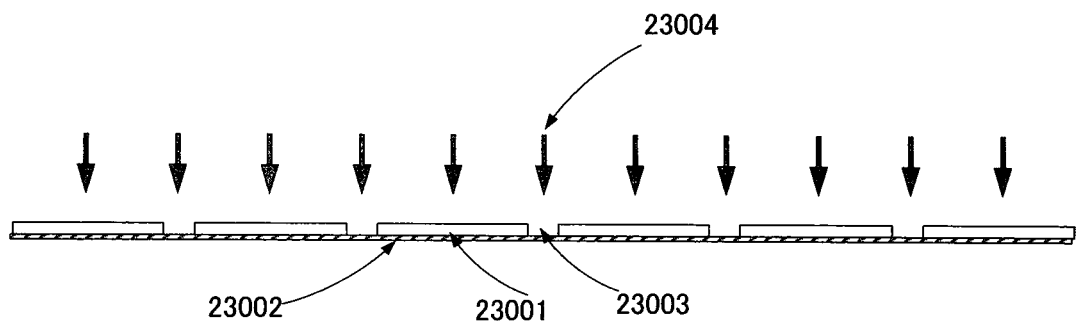
FIG. 23 shows an exemplary manufacturing method of this invention wherein a coating layer is applied on the substrate with holes.

FIG. 23 shows an example of manufacturing method to apply a coating layer on the substrate with holes. The substrate with holes can be roller-coated, gravure-coated, and bar-coated or printed by an ink-jet printer or a laser printer. The area of holes can be opened by sand-blast, air pressure, and air blow, vacuum or chemically etched.

Figure 24:
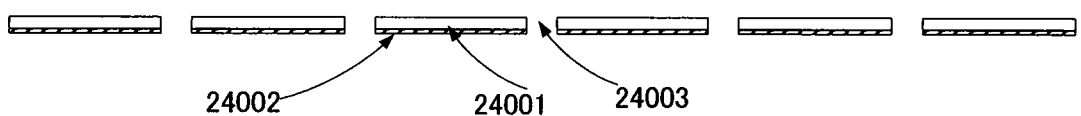
FIG. 24 shows an exemplary substrate with holes and decorative pattern is coated.

FIG. 24 shows an example of substrate (24001) with holes (24003) and decorative pattern (24002) is coated.

Figure 25:
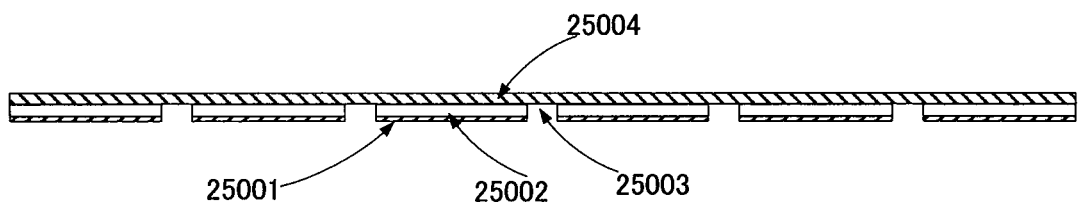
FIG. 25 shows an exemplary embodiment of this invention where a diffusion layer is coated on the substrate with holes.

FIG. 25 shows an example of this invention where diffusion layer (25004) is coated on the substrate (25002) with holes (25003).

Figure 26:
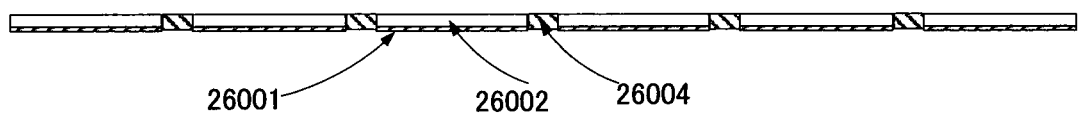
FIG. 26 shows an exemplary embodiment of this invention where a diffusion material is filled in the holes.

FIG. 26 shows an example of this invention were diffusion material (26004) is filled in the holes.

Figure 27:
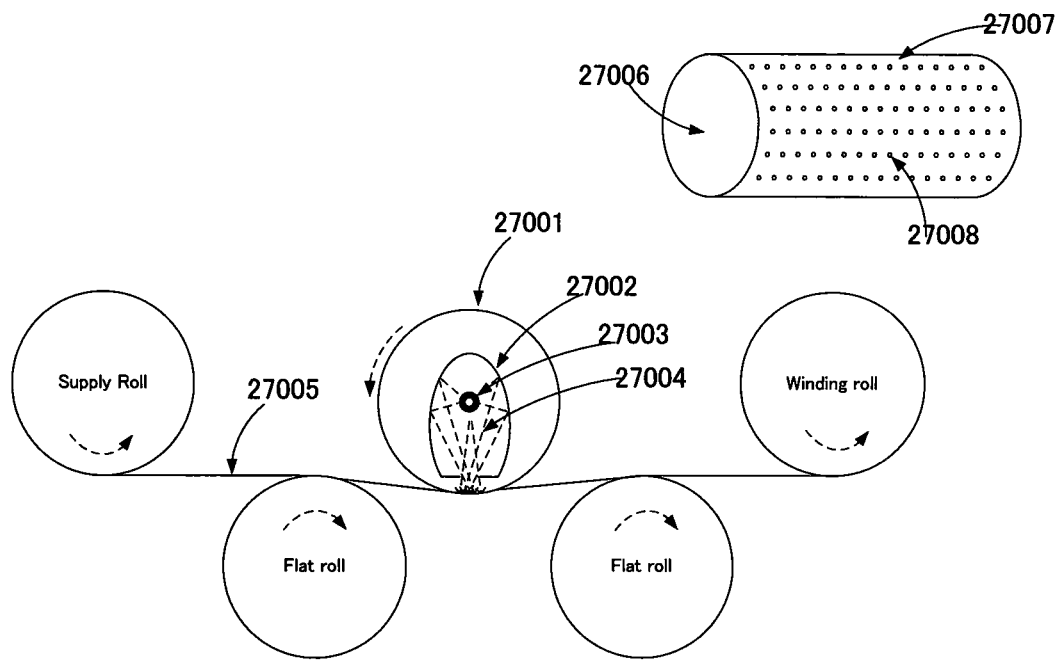
FIG. 27 shows an exemplary embodiment of this invention where the pattern of holes is seamless.

FIG. 27 shows an example of this invention where the pattern of holes is seamless, although the example in FIG. 22 will have seams between two exposures. When a large continuous screen is required, this method has an advantage. A photo-resist pre-coated base substrate (27005) without holes is fed to the roll-to-roll web and the photo-resist is continuously exposed without any seam endlessly. A roller (27001 27006 and 27007) has holes (27008) and is rotational. A stationary light exposure system comprising a UV light source (27003) and a reflector (27002) is placed inside the roller with holes and emits UV light to expose the photo-resist on the base substrate. The hole pattern is exposed on the photo-resist and developed to create holes in the photo-resist. Later the roll substrate will be chemically etched or patterned to make holes. The base substrate can be metal and holes can be etched. The base substrate can be an emulsion film and holes can be transparent areas in a black emulsion film.

Figure 28:
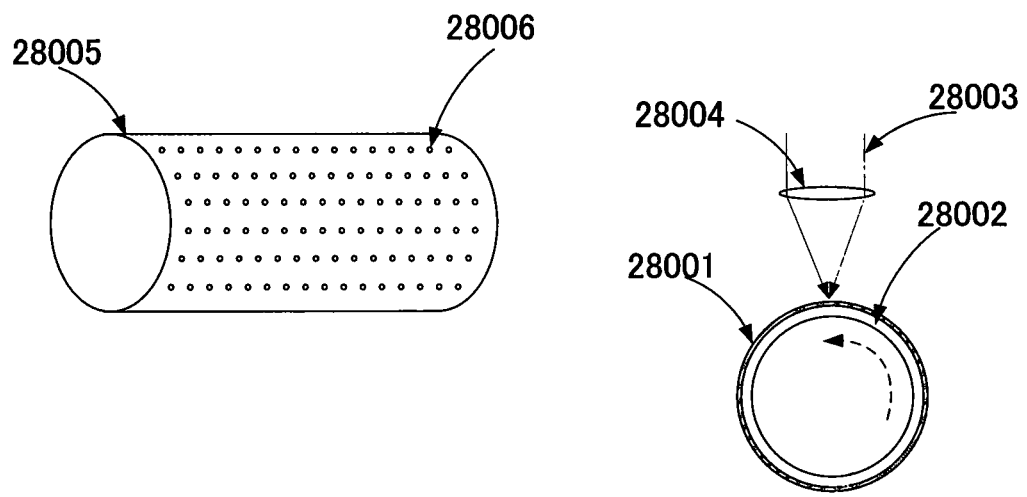
FIG. 28 shows an exemplary manufacturing method of this invention to produce a reticle roller with holes.

FIG. 28 is an example of manufacturing method to produce such a reticle roller with holes by this invention. A transparent tube such as a quartz tube (28002) is coated with photo-resist (28001) and exposed with a focused laser beam (28003). After development, hole pattern can be made by chemical development. The reticle tube can be metal plated and photo-resist is coated over the metal layer. By exposing resist by the same method and the metal layer can be etched to create holes. Another method is thin metal tube can be used and holes can be made by the same method.

Figure 29:
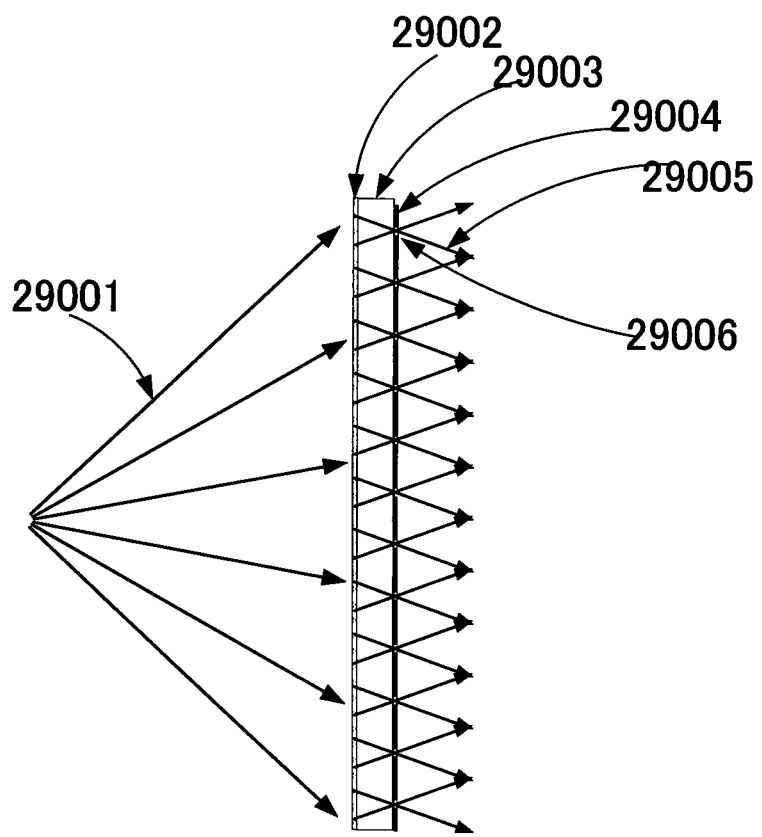
FIG. 29 shows another exemplary embodiment of this invention with a special projection screen.
Figure 30:
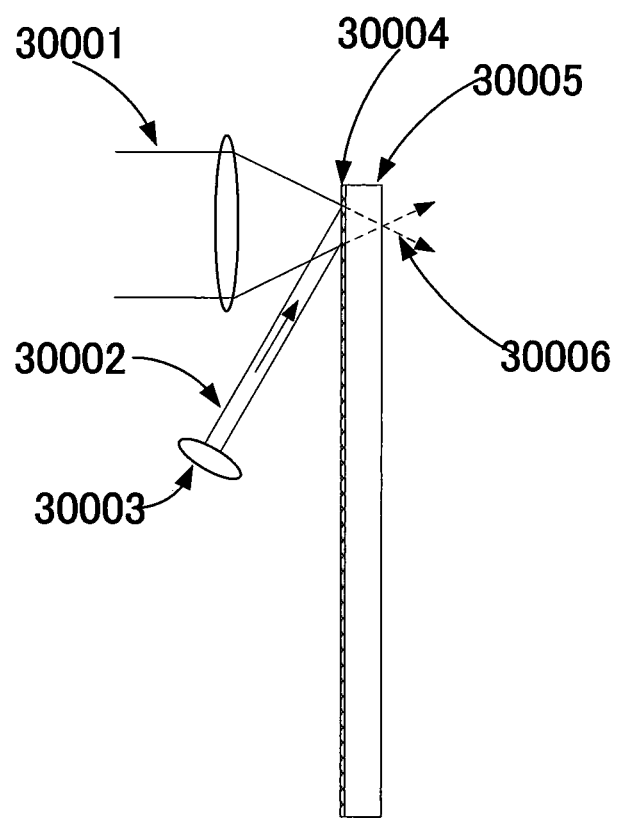
FIG. 30 shows an exemplary hologram combined with tiled displays implemented in this invention.
Figure 31:
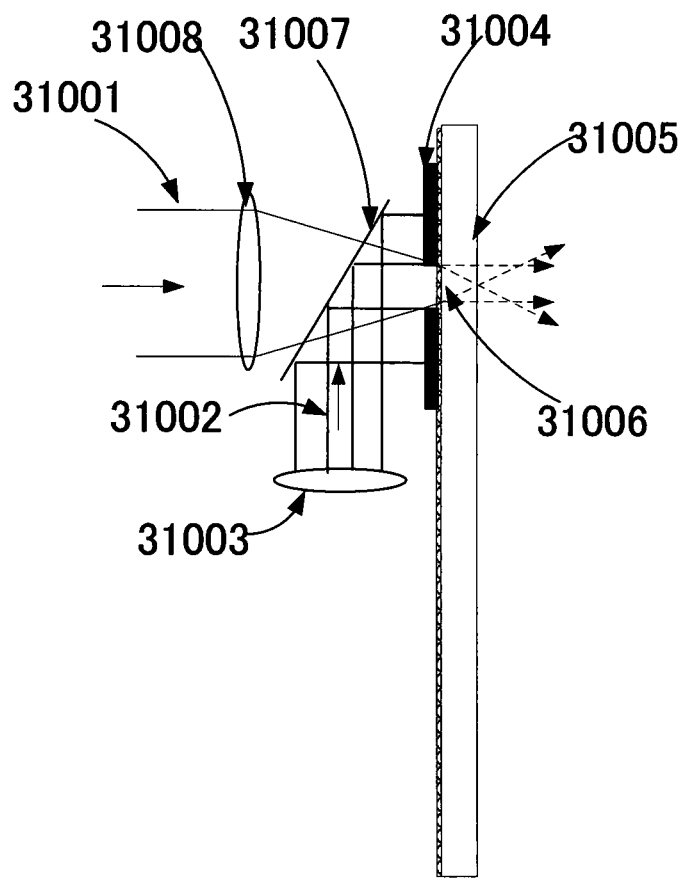
FIG. 31 shows another exemplary embodiment of this invention to illustrate a method to expose a hologram shown in FIG. 30.

FIG. 29 shows an example of this invention. A projection screen must have 1) bending the incident light from a projector toward viewers. 2) pass the majority of incident light toward viewers as much as possible, ideally 100% of incident light toward viewers and 3) absorbing the ambient light coming from the outside of screen (from viewer side) to minimize the reflection as much as possible to avoid the deterioration of the image contrast so that a black image can be as dark as possible, because the reflected light by the screen will make a black image gray. For this purpose, a Fresnel lens is needed for 1) and a micro-lens-array is needed for 2) and holes and dark external coating are needed for 3). This function can be substituted by a single layer of hologram as shown in FIG. 29, if the hologram is created by the exposure as shown in FIG. 30 or FIG. 31. The incident light beams (29001) reach the hologram layer (29002) and the hologram bends the light toward viewers and focuses into a small area and a dark substrate can be used to minimize the reflectance.

FIG. 30 shows an example of hologram by this invention combined with tiled displays. A laser object beam (30001) focused into a small area (30006) and a reference beam (30003) coherent to the first beam (30001) in the angle same as the incident angle from a projector are applied and expose the hologram layer (30004). The angle of the reference beam must be adjusted so that the angle will be the same as projector's beam.

FIG. 31 shows another example of this invention to expose a hologram for this purpose. The method described in the previous paragraph can cause a conflict of beams when the reference beam is close to the normal direction. To avoid the conflict, a beam splitter (31007) is used. The angle of reference beam can be adjusted by rotating the beam splitter (31007). The beam splitter can be a half-mirror or PBS (polarized-beam-splitter). To limit the exposure area, an aperture (21004) can be used.

Figure 32:
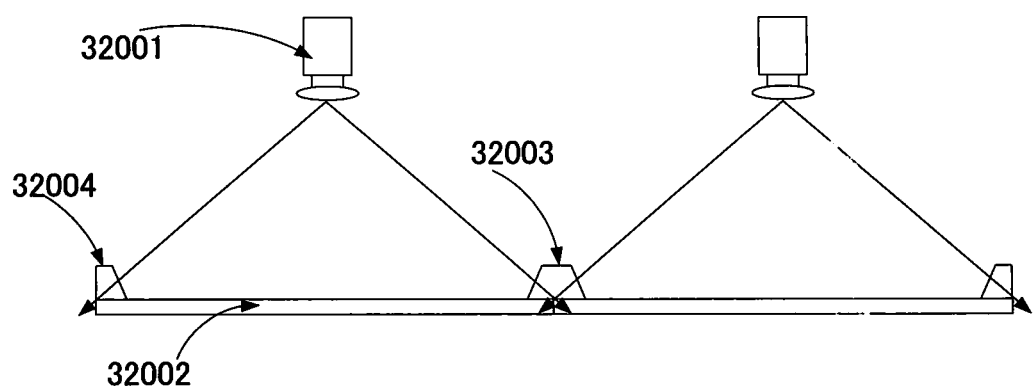
FIG. 32 shows another exemplary embodiment of this invention, where a thinner screen and transparent wedges are used to hold the screens even the light from the projectors is not obstructed.

FIG. 32 shows another example of this invention, where a thinner screen (32002) and transparent wedges (32003, 32004) are used to hold the screens although the light from the projectors (32001) is not obstructed.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

We claim:

1. A tiled display system comprising:
   image projectors wherein each projector projects a light beam onto a separate rear projection screen with the rear projection screens arranged adjacent to each other;
   edges of two adjacent projection screens are optically connected and the projected light beams from two adjacent projectors are overlapped at the connecting areas and the overlapped images are aligned and the intensities are adjusted so that the connected areas have minimum discontinuity of images and intensities to avoid visible seams; and
   the two adjacent screens are connected optically with glue having substantially same refractive index as those of connecting screens.

2. The tiled display system of claim 1 wherein:
   the projection screens comprise a Fresnel lens.

3. The display system of claim 1 wherein:
   the sum of the intensities of two light beams in the connecting area of two screens from two adjacent projectors is substantially equal to that of a middle area of one of the screens.

4. The display system of claim 1 wherein:
   the alignment and the intensities of the brightness of two images from two adjacent projectors are measured by a camera and adjusted automatically so that the seams are substantially not visible.

5. The display system of claim 1 wherein:
   the layer of screen exposed to viewers is a continuous single piece of sheet so that no seam on the screen is visible.

6. The display system of claim 1 wherein:
   the screens are made of hologram.

7. The tiled display system of claim 1 wherein:
   the projection screens comprise a diffusing layer.

8. The tiled display system of claim 1 wherein:
   the projection screens comprise a lenticulars.

9. The tiled display system of claim 1 wherein:
   the projection screens comprise a micro-lens-array.

10. A tiled display system comprising:
    image projectors wherein each projector projects a light beam onto a separate rear projection screen with the rear projection screens arranged adjacent to each other;
    edges of two adjacent projection screens are optically connected and the projected light beams from two adjacent projectors are overlapped at the connecting areas and the overlapped images are aligned and the intensities are adjusted so that the connected areas have minimum discontinuity of images and intensities to avoid visible seams; and
    the screen further comprises a micro-lens-array made of UV curable resin and formed with a lithography process to open holes in the screen.

11. The display system of claim 10 wherein:
    the micro-lens-array is molded with a cylindrical mold in a roll-to-roll system with UV curable resin.

12. The display system of claim 10 wherein:
    the screens with the holes are made an etching process.

13. The display system of claim 12 wherein:
    an exposure system for said lithography has a cylindrical reticle for exposing hole patterns continuously without seam.

14. The display system of claim 13 wherein:

the cylindrical reticle comprises a surface of cylindrical roller and at least one of an etched metal, exposed emulsion and exposed photo-resist.

15. A tiled display system comprising:

image projectors wherein each projector projects a light beam onto a separate rear projection screen with the rear projection screens arranged adjacent to each other;

edges of two adjacent projection screens are optically connected and the projected light beams from two adjacent projectors are overlapped at the connecting areas and the overlapped images are aligned and the intensities are adjusted so that the connected areas have minimum discontinuity of images and intensities to avoid visible seams; and the layer of screen exposed to viewers is a continuous single piece of sheet so that no seam on the screen is visible.

16. A tiled display system comprising:

image projectors wherein each projector projects a light beam onto a separate rear projection screen with the rear projection screens arranged adjacent to each other;

edges of two adjacent projection screens are optically connected and the projected light beams from two adjacent projectors are overlapped at the connecting areas and the overlapped images are aligned and the intensities are adjusted so that the connected areas have minimum discontinuity of images and intensities to avoid visible seams; and the projection screens comprise a layer with holes.

* * * * *